United States Patent
Baba (10) Patent No.: US 10,074,989 B2
(45) Date of Patent: Sep. 11, 2018

(54) POWER CONVERSION APPARATUS, METHOD FOR POWER MANAGEMENT, AND POWER CONVERSION SYSTEM

(71) Applicant: KYOCERA Corporation, Kyoto-shi, Kyoto (JP)

(72) Inventor: Masahiro Baba, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 198 days.

(21) Appl. No.: 14/907,250

(22) PCT Filed: Jul. 25, 2014

(86) PCT No.: PCT/JP2014/003935
§ 371 (c)(1),
(2) Date: Jan. 22, 2016

(87) PCT Pub. No.: WO2015/011931
PCT Pub. Date: Jan. 29, 2015

(65) Prior Publication Data
US 2016/0172861 A1 Jun. 16, 2016

(30) Foreign Application Priority Data
Jul. 26, 2013 (JP) .................. 2013-155931

(51) Int. Cl.
| | |
|---|---|
| H02J 1/00 | (2006.01) |
| H02J 3/00 | (2006.01) |
| H02J 3/38 | (2006.01) |
| G05F 1/67 | (2006.01) |
| H02M 3/04 | (2006.01) |

(Continued)

(52) U.S. Cl.
CPC ............ *H02J 3/383* (2013.01); *G05F 1/67* (2013.01); *H02J 3/385* (2013.01); *H02J 3/46* (2013.01);
(Continued)

(58) Field of Classification Search
CPC ........ H02J 3/00; H02J 3/12; H02J 3/14; H02J 3/38; H02J 3/381; H02J 3/382;
(Continued)

(56) References Cited

U.S. PATENT DOCUMENTS 8,618,692 B2 * 12/2013 Adest .................. H02J 1/102
307/58

FOREIGN PATENT DOCUMENTS

| JP | 2001-352682 A | 12/2001 |
| JP | 2003-309928 A | 10/2003 |

(Continued)

OTHER PUBLICATIONS

International Search Report and Written Opinion of the International Searching Authority issued by the Japanese Patent Office for International Application No. PCT/JP2014/003935.

*Primary Examiner* — Lincoln Donovan
*Assistant Examiner* — Diana J Cheng
(74) *Attorney, Agent, or Firm* — Procopio Cory Hargreaves and Savitch LLP (57) ABSTRACT

Remaining power generation capability of power generation apparatuses is estimated to a high degree of accuracy. A power conversion apparatus (1) includes input interfaces (11) that input generated power from each of multiple power generation apparatuses (10) of the same type and a controller (14) that performs MPPT control on a priority basis on at least one input interface among the input interfaces and acquires the remaining power generation capability of the power generation apparatuses (10) connected to the other input interfaces (11) by calculation using the generated current of the power generation apparatus (10) connected to the at least one input interface.

10 Claims, 7 Drawing Sheets

(51) Int. Cl.
*H02M 7/44* (2006.01)
*H02J 3/46* (2006.01)
H02M 3/156 (2006.01)
H02J 3/14 (2006.01)

(52) U.S. Cl.
CPC ............... *H02M 3/04* (2013.01); *H02M 7/44* (2013.01); *H02J 3/14* (2013.01); *H02J 2003/007* (2013.01); *H02M 3/156* (2013.01); *Y02E 10/58* (2013.01)

(58) Field of Classification Search
CPC .... H02J 3/383; H02J 3/385; H02J 3/46; H02J 3/48; H02J 3/50; H02J 2003/007; G05F 1/66; G05F 1/67; H02M 3/00; H02M 3/02; H02M 3/04; H02M 3/10; H02M 3/145; H02M 3/15; H02M 3/155; H02M 3/156; H02M 3/1563; H02M 7/42; H02M 7/44; Y02E 10/50; Y02E 10/56; Y02E 10/58
USPC ... 307/43, 52–55, 57, 58, 63, 69–71, 77, 78, 307/82, 84
See application file for complete search history.

(56) References Cited

FOREIGN PATENT DOCUMENTS

| | | |
|---|---|---|
| JP | 2005-086953 A | 3/2005 |
| JP | 2013-183578 A | 9/2013 |

\* cited by examiner

POWER CONVERSION APPARATUS, METHOD FOR POWER MANAGEMENT, AND POWER CONVERSION SYSTEM

CROSS-REFERENCE TO RELATED APPLICATION

This application claims priority to and the benefit of Japanese Patent Application No. 2013-155931 filed Jul. 26, 2013. The entire contents of which each are incorporated herein by reference.

TECHNICAL FIELD

This disclosure relates to a power conversion apparatus that converts the generated power of a plurality of power generation apparatuses, a method for power management, and a power conversion system.

BACKGROUND

In recent years, techniques have become known for using a power management apparatus (for example, a Home Energy Management System (HEMS)) provided for each consumer's facility to control the load established for the consumer's facility, the distributed power source established for the consumer's facility, and the like (see JP 2003-309928 A (PTL 1)).

As the distributed power source, it is thought that a power generation apparatus that generates power from natural energy, such as a photovoltaic power generation apparatus or the like, will be used. The power generation amount during power generation from natural energy can vary for a variety of reasons. In order for the power management apparatus to control other apparatuses, however, it may be necessary to predict the power generation amount. Therefore, it has been proposed to calculate a predicted value of the power generation amount by predicting the solar radiation intensity based on past solar radiation intensity, weather information, and the like and converting the predicted solar radiation intensity into a power generation amount by photovoltaic power generation (see JP 2005-086953 A (PTL 2)).

CITATION LIST

Patent Literature

PTL 1: JP 2003-309928 A
PTL 2: JP 2005-086953 A

SUMMARY

Technical Problem

The power control method disclosed in PTL 2, however, assumes that the maximum output is controlled by Maximum Power Point Tracking (MPPT) control or the like. Moreover, the power generation amount is no more than a predicted value. Therefore, even though this power generation amount assists in predicting the remaining power generation capability at the current time, there is a desire for more accurate information.

It would therefore be helpful to provide a power conversion apparatus, method for power management, and power conversion system that can estimate the remaining power generation capability of a power generation apparatus to a high degree of accuracy.

Solution to Problem

In order to solve the aforementioned problem, a power conversion apparatus according to this disclosure includes: a plurality of input interfaces configured to input generated power from each of a plurality of power generation apparatus of a same type; and a controller configured to perform MPPT control on a priority basis on at least one input interface among the plurality of input interfaces and to acquire a remaining power generation capability of a power generation apparatus connected to another input interface by calculation using a generated current of a power generation apparatus connected to the at least one input interface.

In the power conversion apparatus according to this disclosure, among the plurality of input interfaces, the controller may perform MPPT control on a priority basis on an input interface to which is connected a power generation apparatus with a smallest maximum power generation.

In the power conversion apparatus according to this disclosure, the controller may calculate a maximum power generation of the power generation apparatus connected to the other input interface using the generated current of the power generation apparatus connected to the input interface on which MPPT control is performed and may calculate the remaining power generation capability to be a difference between the maximum power generation and actual power generation.

In the power conversion apparatus according to this disclosure, the controller may estimate the remaining power generation capability during independent operation that is disconnected (paralleled off) from a power grid.

In the power conversion apparatus according to this disclosure, the plurality of input interfaces may be a plurality of DC/DC converters each configured to convert voltage of DC power that is input from the plurality of power generation apparatuses.

The power conversion apparatus according to this disclosure may further include an inverter configured to collectively receive input of voltage output by the plurality of DC/DC converters.

In the power conversion apparatus according to this disclosure, each of the plurality of power generation apparatuses may be a solar cell string in which a plurality of solar cell modules are connected in series.

In the power conversion apparatus according to this disclosure, all of the plurality of solar cell modules may have equivalent characteristics.

In order to solve the aforementioned problem, a power conversion system according to this disclosure includes: a power conversion apparatus; and a plurality of power generation apparatuses of a same type connected to the power conversion apparatus, such that the power conversion apparatus includes: a plurality of input interfaces configured to input generated power from each of the plurality of power generation apparatuses; and a controller configured to perform MPPT control on a priority basis on at least one input interface among the plurality of input interfaces and to acquire a remaining power generation capability of a power generation apparatus connected to another input interface by calculation using a generated current of a power generation apparatus connected to the at least one input interface.

In order to solve the aforementioned problem, a method according to this disclosure for power management using a power conversion apparatus that converts input power from a plurality of power generation apparatuses of a same type to a predetermined output is a method including: inputting generated power from each of the plurality of power generation apparatuses into a plurality of input interfaces of the power conversion apparatus; performing MPPT control on a priority basis on at least one input interface among the plurality of input interfaces; and acquiring a remaining power generation capability of a power generation apparatus connected to another input interface by calculation using a generated current input into the input interface on which MPPT control is performed.

Advantageous Effect

According to this disclosure, the remaining power generation capability of a power generation apparatus can be estimated to a high degree of accuracy.

DETAILED DESCRIPTION

With reference to the drawings, the following describes the disclosed embodiments in detail.

Embodiment 1

Figure 1:
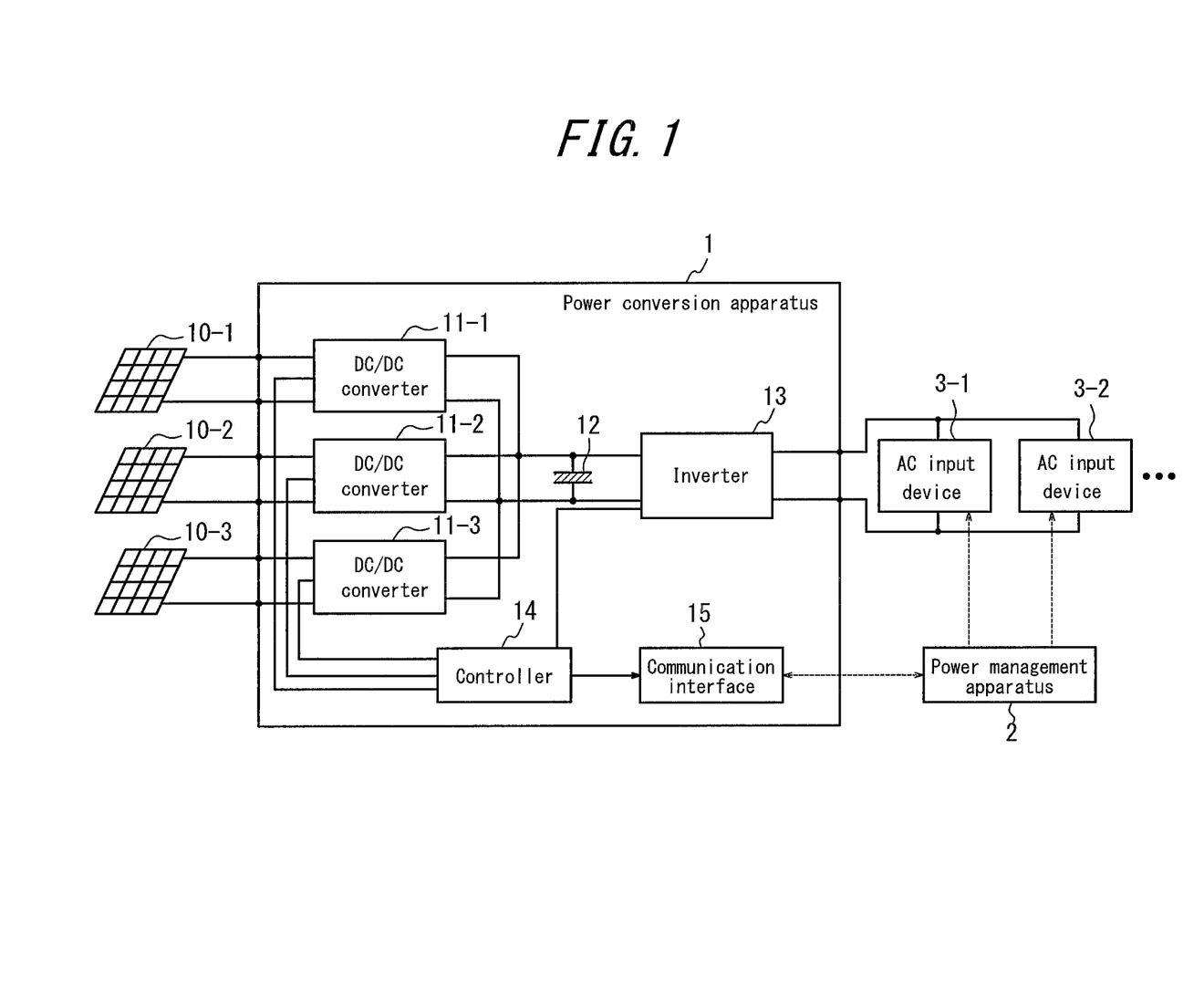
FIG. 1 is a block diagram illustrating an example of the structure of a system including a power conversion apparatus according to one of the disclosed embodiments.

FIG. 1 is a block diagram illustrating an example of the structure of a system including a power conversion apparatus according to one of the disclosed embodiments. As illustrated in FIG. 1, a power conversion apparatus (power conditioner) 1 includes a plurality of DC/DC converters (input interfaces) 11, an intermediate link capacitor 12, an inverter 13, a controller 14, and a communication interface 15. The power conversion system includes a power conversion apparatus 1 and a plurality of power generation apparatuses (DC input power supplies) 10. Although the output of the power conversion apparatus 1 in FIG. 1 is a single-phase two-wire system, the output format is not limited to this system and may, for example, be a three-phase system.

The power conversion apparatus 1 converts the DC power that is input from the connected plurality of power generation apparatuses 10. The power conversion apparatus 1 normally performs interconnected operation by interconnecting with the power grid and performs independent operation by disconnecting (paralleling off) from the grid when a power outage occurs in the power grid. The power conversion apparatus 1 thus supplies power to loads of the consumer's facility.

The power generation apparatus 10 outputs DC power. Each of the plurality of power generation apparatuses 10 is a distributed power source, such as a solar cell string, in which a plurality of solar cell modules that convert sunlight to DC power are connected in series; a wind power generator; a fuel cell; or the like. All of the characteristics of the plurality of solar cell modules are preferably the same, for example as a result of each solar cell module being exactly the same.

The DC/DC converter (input interface) 11 converts the voltage input from a plurality of power generation apparatuses 10 of the same type for alignment to a constant voltage. In this embodiment, there are three each of the power generation apparatuses 10 and the DC/DC converters 11, but it suffices for there to be two or more each of the power generation apparatuses 10 and the DC/DC converters 11.

The intermediate link capacitor 12 smooths the DC voltage, which was raised by the DC/DC converter 11, to stabilize the input voltage that is input into the inverter 13. A capacitor for smoothing may be further provided inside each DC/DC converter 11 in order to stabilize the output voltage.

The inverter 13 collectively receives input of the voltage output by the DC/DC converters 11 and converts the DC voltage smoothed by the intermediate link capacitor 12 into AC voltage. The inverter 13 is normally interconnected to the power grid but performs independent operation during a power outage or the like, disconnecting from the power grid and supplying AC power to AC input devices (load devices) 3. FIG. 1 illustrates connection between the power conversion apparatus 1 and AC input devices 3 during independent operation.

The controller 14 controls the output of the DC/DC converters 11 and the inverter 13 by controlling the duty cycle of the switching elements in the DC/DC converters 11 and the inverter 13. During independent operation that is disconnected from the power grid, the controller 14 acquires the remaining power generation capability of the power generation apparatuses 10 by calculation. At this time, the controller 14 performs MPPT control on a priority basis on at least one DC/DC converter 11 and uses the generated current of the power generation apparatus 10 connected to the DC/DC converter 11 to calculate the remaining power generation capability of the power generation apparatuses 10 connected to the other DC/DC converters 11.

The communication interface 15 acquires remaining power information indicating the remaining power generation capability of the power generation apparatuses 10 from the controller 14 and transmits the remaining power information to a power management apparatus 2.

The power management apparatus 2 is a apparatus that controls the operation of load devices connected to the power conversion apparatus 1, and depending on the target of management, may be referred to as a Home Energy Management System (HEMS), Building Energy Management System (BEMS), Factory Energy Management System (FEMS), or Community Energy Management System (CEMS). The power management apparatus 2 receives the remaining power information from the communication interface 15 and acquires power consumption information from the AC input devices 3. Based on these pieces of information, the power management apparatus 2 controls the AC input devices 3.

Figure 2:
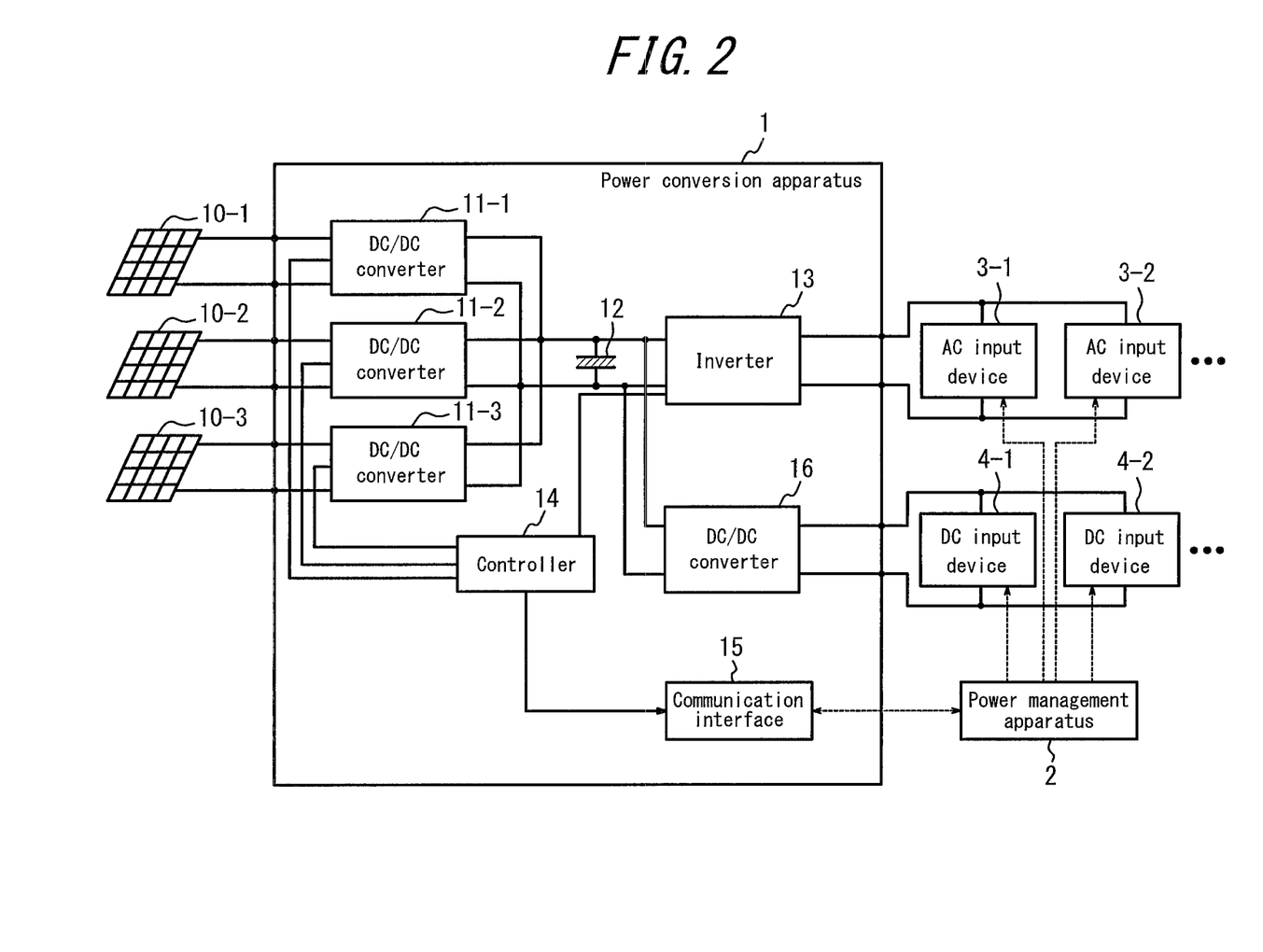
FIG. 2 is a block diagram illustrating another example of the structure of a power conversion apparatus according to one of the disclosed embodiments.

FIG. 2 is a block diagram illustrating another example of the structure of the power conversion apparatus 1. As compared to the power conversion apparatus 1 illustrated in FIG. 1, the power conversion apparatus 1 illustrated in FIG. 2 further includes a DC/DC converter 16 on the output side. The DC/DC converter 16 converts the DC voltage smoothed by the intermediate link capacitor 12 to a predetermined DC voltage and supplies DC power to DC input devices 4 during independent operation. By providing the DC/DC converter 16, DC power can be supplied to the DC input devices 4.

In this way, the power conversion apparatus 1 includes a power converter on the output side. The power converter may be the inverter 13 alone, as illustrated in FIG. 1, or may be the inverter 13 and the DC/DC converter 16 connected in parallel, as illustrated in FIG. 2. Although not illustrated, the power converter may also be the DC/DC converter 16 alone, or may be any number of inverters 13 and DC/DC converters 16 connected in parallel.

Figure 3:
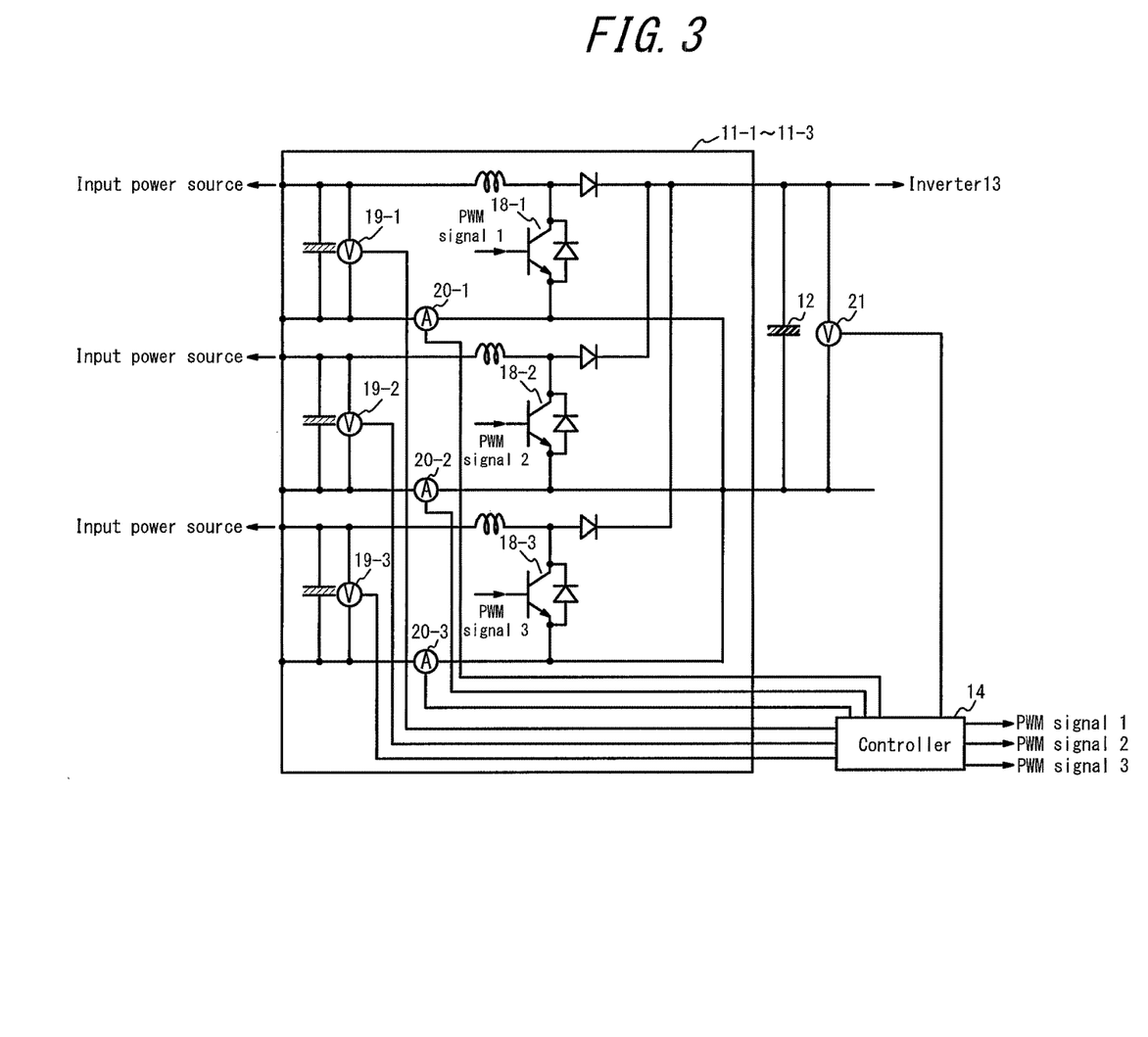
FIG. 3 is a circuit diagram of DC/DC converters in the power conversion apparatus according to one of the disclosed embodiments.

FIG. 3 illustrates an example of a circuit diagram of the DC/DC converters 11 in the power conversion apparatus 1. FIG. 3 also illustrates the controller 14 that performs control on the DC/DC converters 11. FIG. 3 illustrates typical non-isolated boost converters, but the specific circuit structure is not limited to this example. Any structure having a function that can change the impedance as viewed from the input power source and that can control each input power independently to be a desired value may be adopted.

The controller 14 monitors the input voltage of each DC/DC converter 11 detected by input voltage sensors 19 (19-1, 19-2, 19-3), the input current of each DC/DC converter 11 detected by input current sensors 20 (20-1, 20-2, 20-3), and the intermediate link voltage of the inverter 13 detected by an intermediate link voltage sensor 21. Based on these values, the controller 14 generates a PWM signal for the switching element 18 (18-1, 18-2, 18-3) of each of the DC/DC converters 11. Details regarding the control performed on the DC/DC converters 11 are provided below.

Figure 4:
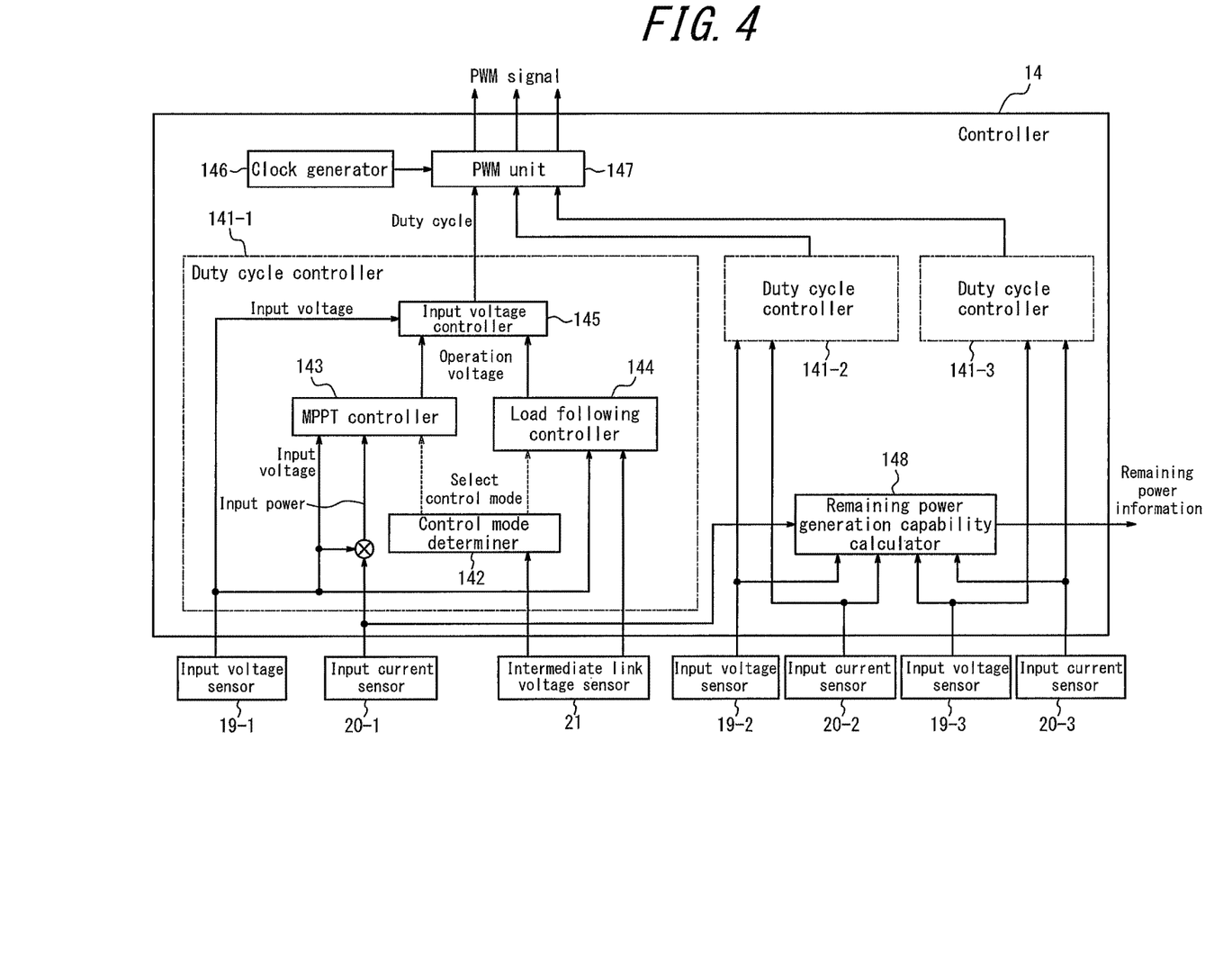
FIG. 4 is a block diagram illustrating the function of a controller in the power conversion apparatus according to one of the disclosed embodiments.

FIG. 4 is a block diagram illustrating the functions of the controller 14 in the power conversion apparatus 1. Operations of the controller 14 are described with reference to FIG. 4.

A duty cycle controller 141-1 controls the duty cycle used to generate the PWM signal for the DC/DC converter 11-1. Similarly, a duty cycle controller 141-2 controls the duty cycle used to generate the PWM signal for the DC/DC converter 11-2, and a duty cycle controller 141-3 controls the duty cycle used to generate the PWM signal for the DC/DC converter 11-3. The duty cycle controllers 141-2 and 141-3 perform the same control as the duty cycle controller 141-1. Moreover, the internal structure of the duty cycle controllers 141-2 and 141-3 is the same as that of the duty cycle controller 141-1 and therefore is not illustrated.

A control mode determiner 142 determines the control mode to be MPPT control during interconnected operation. During MPPT control, the power generation obtained from the power generation apparatus 10 is controlled so as to be maximized.

If MPPT control is performed on all of the DC/DC converters 11 during independent operation, however, the balance between the power consumption of the AC input devices 3 and the power generation of the power generation apparatuses 10 is lost. If load following control is performed on all of the DC/DC converters 11 during independent operation, it becomes difficult for the power generation apparatuses 10 to generate power at maximum power. During load following control, the output voltage of the DC/DC converter 11 is controlled so that the power consumption of the load and the power generation of the input power source become the same. If the power generation apparatus 10 that is trying to follow the power consumption of the load exceeds the maximum power point, the power generation of that power generation apparatus 10 reduces, causing the other power generation apparatuses 10 to exceed the maximum power point by a chain reaction. Ultimately, operation may be suspended due to a lack of power generation.

Therefore, in accordance with the intermediate link voltage detected by the intermediate link voltage sensor 21 during independent operation, the control mode determiner 142 determines the control mode to be either MPPT control or load following control. For example, if the maximum power generation of each power generation apparatus 10 is 200 W, and the power consumption of the AC input devices 3 is 500 W, then the DC/DC converters 11-1 and 11-2 are subjected to MPPT control to obtain a power of 400 W, and the DC/DC converter 11-3 is subjected to load following control to obtain the remaining 100 W of power. In this way, the overall power generation of the power generation apparatuses 10 is made to follow the power consumption of the load.

An MPPT controller 143 monitors the input voltage detected by the input voltage sensor 19 and the input current detected by the input current sensor 20. When the control mode is determined to be MPPT control by the control mode determiner 142, the MPPT controller 143 determines the operation voltage that maximizes the input power to the power conversion apparatus 1. Whereas following is based on input voltage in the example illustrated in FIG. 4, the specific form of MPPT control is not limited to this example.

When the control mode is determined to be load following control by the control mode determiner 142, a load following controller 144 determines the operation voltage that causes the intermediate link voltage detected by the intermediate link voltage sensor 21 to become a target voltage.

An input voltage controller 145 compares the input voltage detected by the input voltage sensor 19 with an operation voltage command value that is determined by the MPPT controller 143 or the load following controller 144 and performs feedback control to change the duty cycle so that the difference becomes equivalent to zero. In the example illustrated in FIG. 4, control is performed so that the operation voltage of the input power source becomes the command value, but it suffices for the controller 14 to perform control to switch between MPPT control and load following control based on the intermediate link voltage. Therefore, control may be performed based on the operation current of the input power source (feedback control based on input current).

A PWM unit 147 generates a PWM signal by comparing a reference waveform, which is synchronized with a clock generated by a clock generator 146, with the duty cycle generated by the input voltage controller 145. The PWM unit 147 then outputs the PWM signal to each DC/DC converter 11.

During independent operation that is disconnected from the power grid, a remaining power generation capability calculator 148 uses the generated current of the power generation apparatus 10 connected to the DC/DC converter 11 on which MPPT control is performed to calculate the remaining power generation capability of the power generation apparatuses 10 connected to the other DC/DC converters 11 and outputs remaining power information indicating the remaining power generation capability to the communication interface 15. Details on the calculation method are provided below.

Figure 5:
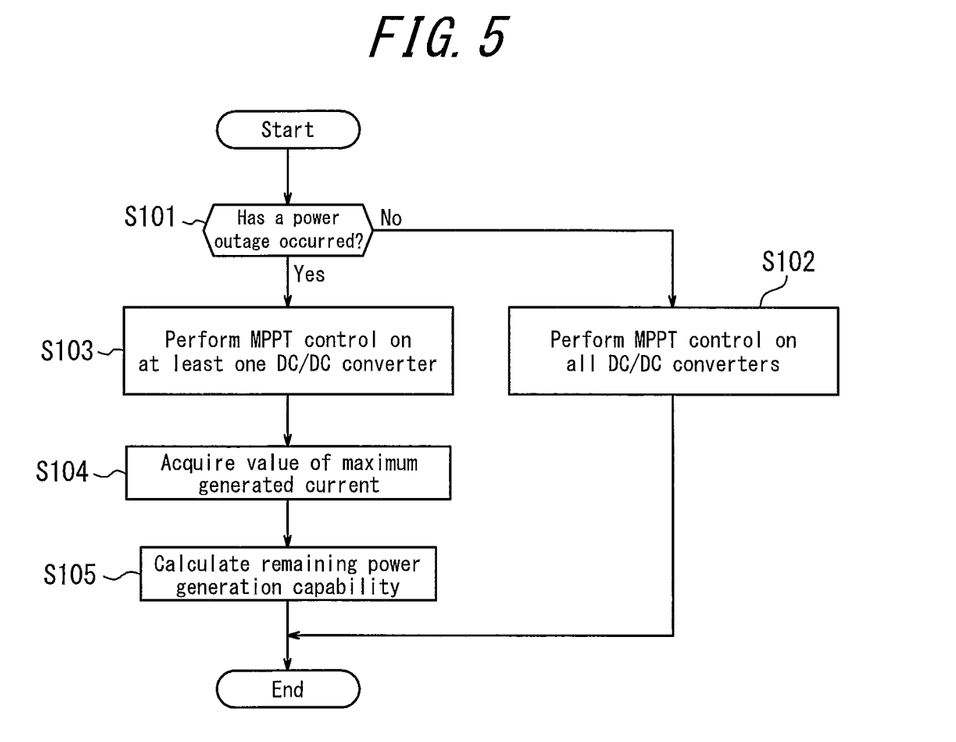
FIG. 5 is a flowchart illustrating a method for power management according to one of the disclosed embodiments.

FIG. 5 is a flowchart illustrating a method for power management using the power conversion apparatus 1. When a power outage has not occurred (step S101: No), the controller 14 performs interconnected operation and performs MPPT control on all of the DC/DC converters 11 (step S102).

When a power outage has occurred (step S101: Yes), the controller 14 disconnects from the grid to perform independent operation and performs MPPT control on a priority basis on at least one DC/DC converter 11 (step S103). The reason is described with reference to FIGS. 6 and 7.

Figure 6:
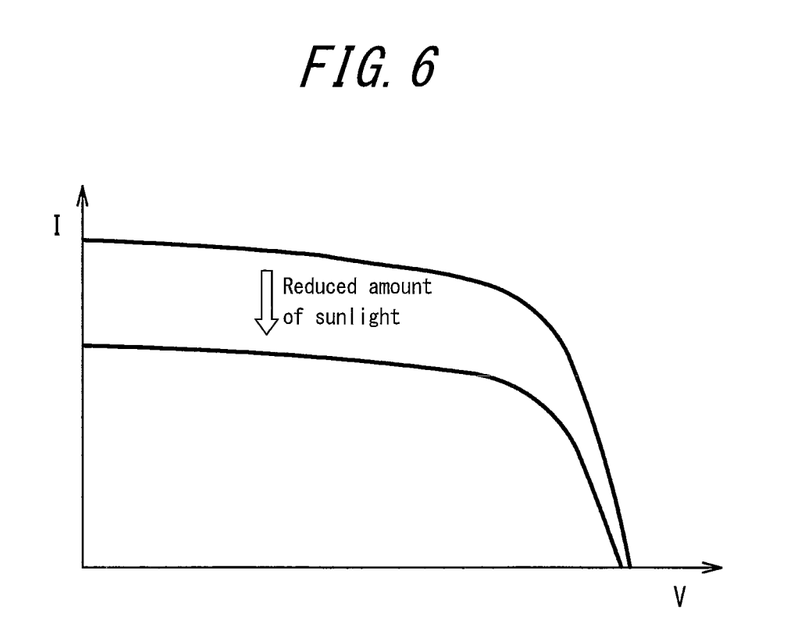
FIG. 6 illustrates the current/voltage characteristics of a power generation apparatus in the power conversion apparatus according to one of the disclosed embodiments.

FIG. 6 illustrates the current/voltage characteristics when the power generation apparatus 10 is a solar cell string. The horizontal axis represents output voltage, and the vertical axis represents output current. The output voltage of the solar cell string is determined by the number of solar cell modules and the temperature and exhibits little change. On the other hand, the output current of the solar cell string varies greatly due to the amount of sunlight. When the amount of sunlight decreases, the output current reduces. In other words, when the amount of sunlight changes, the maximum power generation depends on the generated current.

Figure 7:
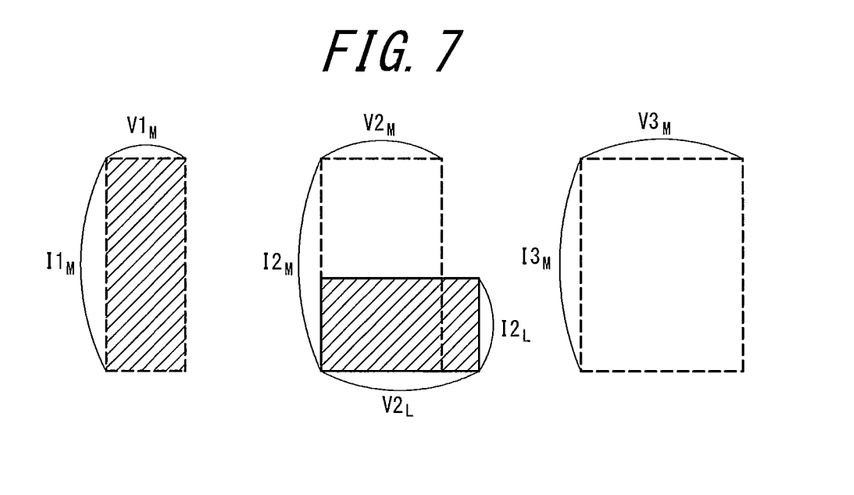
FIG. 7 illustrates power generation of the power generation apparatuses in the power conversion apparatus according to one of the disclosed embodiments.

FIG. 7 schematically illustrates the voltage and current generated by three power generation apparatuses 10-1, 10-2, and 10-3. In this embodiment, the maximum power generation increases in the order of the power generation apparatus 10-1, power generation apparatus 10-2, and power generation apparatus 10-3. The area of the portion enclosed by the dashed line indicates the maximum power generation during interconnected operation (i.e. during MPPT control), and the area of the hatched portion indicates power generation during independent operation.

The generated voltages $V1_M$, $V2_M$, and $V3_M$ of the power generation apparatuses 10 during MPPT control take different values in accordance with the number of solar cell modules in each power generation apparatus 10. On the other hand, the generated currents $I1_M$, $I2_M$, and $I3_M$ of the power generation apparatuses 10 during MPPT control vary in accordance with the amount of sunlight. Assuming that the amount of sunlight is the same for the power generation apparatuses 10, however, the relationship $I1_M=I2_M=I3_M$ can be assumed. Accordingly, by performing MPPT control on a priority basis on at least one DC/DC converter 11 during independent operation (step S103), the controller 14 can learn what the generated current is when MPPT control is performed on the other DC/DC converters 11.

During independent operation, even when the power consumption of the AC input devices 3 is low, it is thought that the power consumption will exceed the maximum power generation of the power generation apparatus 10-1. Therefore, during independent operation, the controller 14 preferably performs MPPT control on a priority basis on the DC/DC converter 11-1 to which the power generation apparatus 10-1 with the smallest maximum power generation is connected. In this way, the value of the maximum generated current can be obtained at an early stage. In the explanation below, MPPT control is assumed to be performed on a priority basis on the DC/DC converter 11-1.

For example, when the maximum power generation of the power generation apparatus 10-1 is 100 W, the maximum power generation of the power generation apparatus 10-2 is 200 W, the maximum power generation of the power generation apparatus 10-3 is 300 W, and the power consumption of the AC input devices 3 is 200 W, then the controller 14 performs MPPT control on the DC/DC converter 11-1 and obtains 100 W from the power generation apparatus 10-1. For the remaining 100 W, the controller 14 may perform control to subject the DC/DC converters 11-2 and 11-3 to load following control so that the total power obtained from the power generation apparatus 10-2 and the power generation apparatus 10-3 is 100 W, or the controller 14 may perform control to subject only one of the DC/DC converters 11-2 and 11-3 to load following control so as to obtain 100 W from only one of the power generation apparatuses 10-2 and 10-3.

Next, the remaining power generation capability calculator 148 obtains the value of the generated current $I1_M$ of the power generation apparatus 10-1 from the input current sensor 20-1 (step S104). Using the generated current $I1_M$ of the power generation apparatus 10-1, the remaining power generation capability calculator 148 then calculates the remaining power generation capability of the remaining power generation apparatuses 10-2 and 10-3 as the difference between the maximum power generation and the present power generation (step S105).

The remaining power generation capability calculator 148 stores the values of the generated voltage $V2_M$ and $V3_M$ of the power generation apparatuses 10-2 and 10-3 during interconnected operation (i.e. during MPPT control) and calculates the maximum power generation $P2_M$ of the power generation apparatus 10-2 as $I1_M \times V2_M$ and the maximum power generation $P3_M$ of the power generation apparatus 10-3 as $I1_M \times V3_M$. For example, when the DC/DC converter 11-2 is subjected to load following control as illustrated in FIG. 6, the remaining power generation capability calculator 148 calculates the remaining power generation capability of the power generation apparatus 10-2 as $P2_M-(I2_L \times V2_L)$. The remaining power generation capability calculator 148 acquires the current $I2_L$ from the input current sensor 20-2 and acquires the voltage $V2_L$ from the input voltage sensor 19-2. Using the generated current $I1_M$ of the power generation apparatus 10-1, the remaining power generation capability calculator 148 thus calculates the remaining power generation capability of the other power generation apparatuses 10-2 and 10-3.

In this way, according to this disclosure, the controller 14 performs MPPT control on a priority basis on at least one input interface among a plurality of DC/DC converters (input interfaces) 11 and acquires the remaining power generation capability of the power generation apparatuses connected to the other DC/DC converters 11 by calculation using the generated current of the power generation apparatus connected to the at least one input interface. Therefore, the remaining power generation capability of the power generation apparatuses 10 can be estimated to a high degree of accuracy and in real time.

Embodiment 2

Next, Embodiment 2 is described. In Embodiment 1, the case of considering the amount of sunlight to be the same between the power generation apparatuses 10 was described. The amount of sunlight may differ between power generation apparatuses 10, however, such as in the case of installing the power generation apparatuses 10 to face different directions on a hip roof. Therefore, in Embodiment 2, the case of the amount of sunlight not being the same between the power generation apparatuses 10 is described. Since the structure of the power conversion apparatus 1 in Embodiment 2 is the same as in Embodiment 1, a description thereof is omitted.

Figure 8:
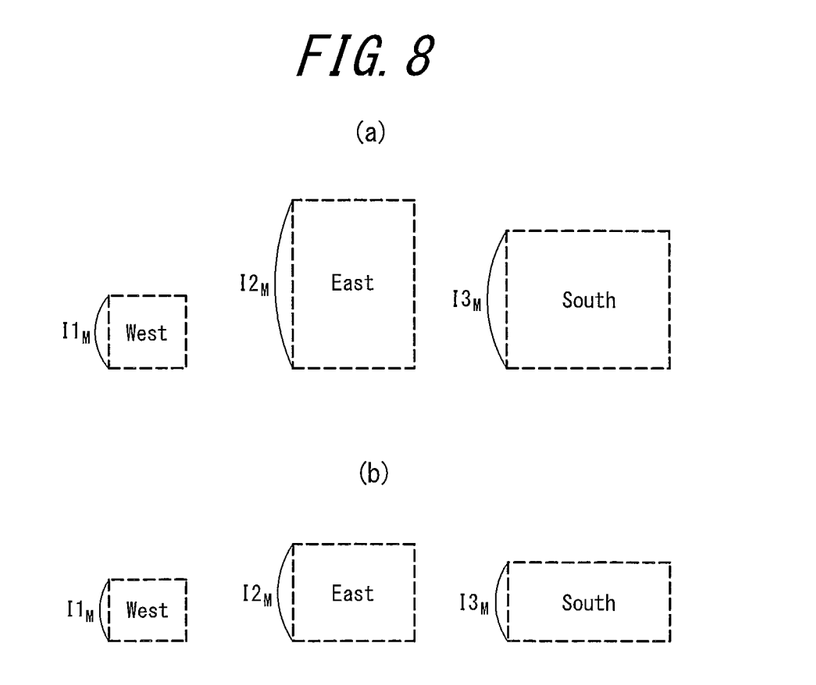
FIGS. 8A and 8B illustrate power generation of the power generation apparatuses in the power conversion apparatus according to one of the disclosed embodiments when the amount of sunlight differs.

FIGS. 8A and 8B illustrate the power generation amount when the amount of sunlight differs between the power generation apparatuses 10. When the power generation apparatus 10-1 is installed on the west side of the roof, the power generation apparatus 10-2 is installed on the east side of the roof, and the power generation apparatus 10-3 is installed on the south side of the roof, the values of the respective generated currents $I1_M$, $I2_M$, and $I3_M$ differ during interconnected operation. The values of the generated currents $I1_M$, $I2_M$, and $I3_M$ also vary in accordance with the amount of sunlight. FIG. 8A illustrates the maximum power generation in the case of a large amount of sunlight at 10 AM, whereas FIG. 8B illustrates the maximum power generation in the case of a small amount of sunlight at 10 AM.

Since the difference in the amount of sunlight is determined by the direction of the sun, the remaining power generation capability calculator 148 stores the ratio of the maximum power generation or generated current of each power generation apparatus 10 during interconnected operation along with time information.

As in Embodiment 1, during interconnected operation the controller 14 performs MPPT control on all of the DC/DC converters 11, and during independent operation, the controller 14 performs MPPT control on the DC/DC converter 11-1 connected to the power generation apparatus 10-1 for which the maximum power generation was the smallest during interconnected operation.

During interconnected operation (i.e. during MPPT control), the remaining power generation capability calculator 148 stores the ratio of the maximum power generation $P1_M$, $P2_M$, and $P3_M$ of the power generation apparatuses 10 or the ratio of the maximum generated current $I1_M$, $I2_M$, and $I3_M$ of the power generation apparatuses 10. During independent operation, the remaining power generation capability is calculated based on the stored maximum power generation ratio or maximum generated current ratio.

When calculating the remaining power generation capability based on the maximum power generation ratio, then based on the value of the generated current $I1_M$ of the power generation apparatus 10-1 acquired from the input current sensor 20-1 and the value of the generated voltage $V1_M$ acquired from the input voltage sensor 19-1, the remaining power generation capability calculator 148 calculates the maximum power generation $P1_M$ as $I1_M \times V1_M$ and calculates the maximum power generation $P2_M$ and $P3_M$ based on the maximum power generation ratio.

When calculating the remaining power generation capability based on the maximum generated current ratio, the remaining power generation capability calculator 148 acquires the value of the generated current $I1_M$ of the power generation apparatus 10-1 from the input current sensor 20-1, calculates the maximum generated currents $I2_M$ and $I3_M$ based on the maximum generated current ratio, calculates the maximum power generation $P2_M$ as $I1_M \times V2_M$, and calculates the maximum power generation $P3_M$ as $I1_M \times V3_M$. Once the maximum power generation is known, the difference from the actual power generation is calculated as the remaining power generation capability.

In Embodiment 1, the generated current $I1_M$ of the power generation apparatus 10-1 is used to calculate the maximum power generation of the power generation apparatuses 10-2 and 10-3. Similarly in Embodiment 2, the maximum power generation of the power generation apparatuses 10-2 and 10-3 may be calculated based on the maximum power generation ratio of the power generation apparatuses 10 during interconnected operation.

In this way, in Embodiment 2, the controller 14 performs MPPT control on a priority basis on at least one input interface among a plurality of DC/DC converters (input interfaces) 11 and calculates the remaining power generation capability based on the maximum power generation ratio or the maximum generated current ratio of the power generation apparatuses 10 during interconnected operation. Therefore, even in the case that the amount of sunlight differs between the power generation apparatuses 10, the remaining power generation capability of the power generation apparatuses 10 can be estimated to a high degree of accuracy and in real time.

The above embodiments have been described as representative examples, but it is to be noted that many modifications and substitutions within the scope and spirit of this disclosure will be apparent to a person of ordinary skill in the art. Accordingly, this disclosure should not be considered to be limited by the above-described embodiments but rather may be modified or altered in a variety of ways without deviating from the scope of the patent claims. For example, even when using a plurality of wind power generators as the power generation apparatuses, at least one may similarly be caused to operate by MPPT control so as to calculate the remaining power generation capability of the other wind power generators.

REFERENCE SIGNS LIST

1 Power conversion apparatus
1 Power management apparatus
3 AC input device
4 DC input devices
10 Power generation apparatus
11 DC/DC converter
12 Intermediate link capacitor
13 Inverter
14 Controller
15 Communication interface
16 DC/DC converter
18 Switching element
19 Input voltage sensor
20 Input current sensor
21 Intermediate link voltage sensor
141 Duty cycle controller
142 Control mode determiner
143 MPPT controller
144 Load following controller
145 Input voltage controller
146 Clock generator
147 PWM unit
148 Remaining power generation capability calculator

The invention claimed is:
1. A power conversion apparatus comprising:
a plurality of input interfaces, wherein each of the plurality of input interfaces is configured to input generated power from one of a plurality of power generation apparatuses of a same type; and
a controller configured to,
based on a priority of the plurality of input interfaces, select at least one of the plurality of input interfaces to control using maximum power point tracking (MPPT), control the selected at least one input interface using MPPT, and calculate a remaining amount of power that can be generated from at least one of one or more remaining unselected input interfaces in the plurality of input interfaces using a measure of current generated by the power generation apparatus connected to the at least one input interface being controlled using MPPT.

2. The power conversion apparatus of claim 1, wherein the plurality of input interfaces are prioritized such that input interfaces with a smaller maximum power generation are prioritized over input interfaces with a higher maximum power generation.

3. The power conversion apparatus of claim 1, wherein the remaining amount of power is calculated as a difference between a maximum power generation amount of the at least one remaining unselected input interface, estimated using the measure of current, and an actual power generation amount of the at least one remaining unselected input interface.

4. The power conversion apparatus of claim 1, wherein the controller performs the selection, control, and calculation during an independent operation in which the power conversion apparatus is disconnected from a power grid.

5. The power conversion apparatus of claim 1, wherein each of the plurality of input interfaces comprises a DC/DC converter configured to convert a voltage of DC power that is input from one of the plurality of power generation apparatuses.

6. The power conversion apparatus of claim 5, further comprising an inverter configured to collectively receive a voltage output from all the DC/DC converters.

7. The power conversion apparatus of claim 1, wherein each of the plurality of power generation apparatuses is a solar cell string in which a plurality of solar cell modules are connected in series.

8. The power conversion apparatus of claim 7, wherein all of the plurality of solar cell modules have equivalent characteristics.

9. A power conversion system comprising:
a power conversion apparatus; and
a plurality of power generation apparatuses of a same type connected to the power conversion apparatus,
wherein the power conversion apparatus comprises
a plurality of input interfaces, wherein each of the plurality of input interfaces is configured to input generated power from one of a plurality of power generation apparatuses, and
a controller configured to,
based on a priority of the plurality of input interfaces, select at least one of the plurality of input interfaces to control using maximum power point tracking (MPPT),
control the selected at least one input interface using MPPT,
and
calculate a remaining amount of power that can be generated from at least one of one or more remaining unselected input interfaces in the plurality of input interfaces using a measure of current generated by the power generation apparatus connected to the at least one input interface being controlled using MPPT.

10. A method for power management using a power conversion apparatus that converts input power from a plurality of power generation apparatuses of a same type to a predetermined output, the method comprising:
inputting generated power from each of the plurality of power generation apparatuses into a corresponding one of the plurality of input interfaces of the power conversion apparatus;
based on a priority of the plurality of input interfaces, selecting at least one of the plurality of input interfaces to control using maximum power point tracking (MPPT);
controlling the selected at least one input interface using MPPT;
and
calculating a remaining amount of power that can be generated from at least one of one or more remaining unselected input interfaces in the plurality of input interfaces using a measure of current input into the at least one input interface being controlled using MPPT.

* * * * *